Figure 1:
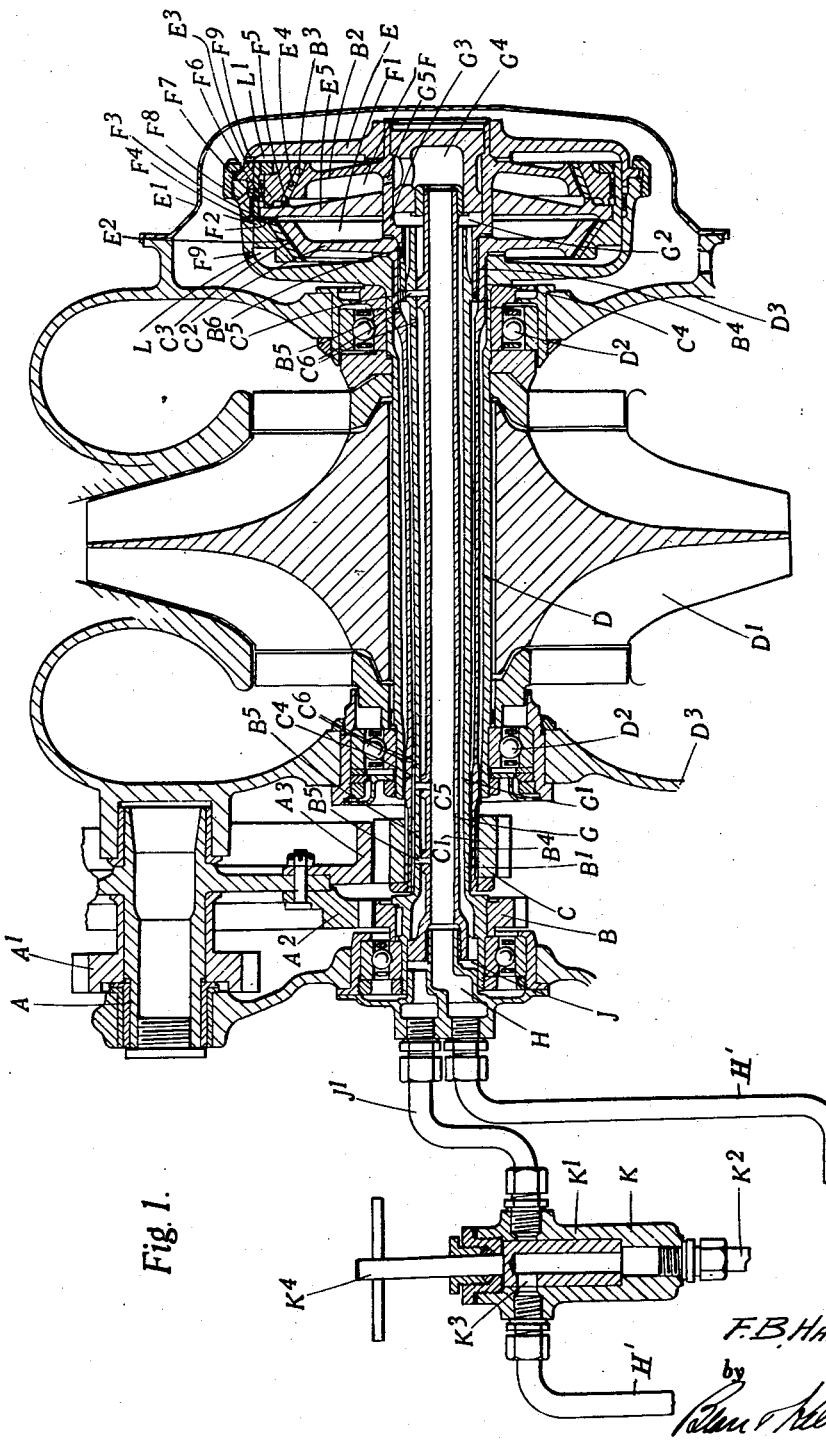

Aug. 6, 1940.　　F. B. HALFORD　　2,210,855
FRICTION CLUTCH
Filed Oct. 3, 1938　　2 Sheets-Sheet 1

Inventor
F. B. HALFORD,
by
Attorneys

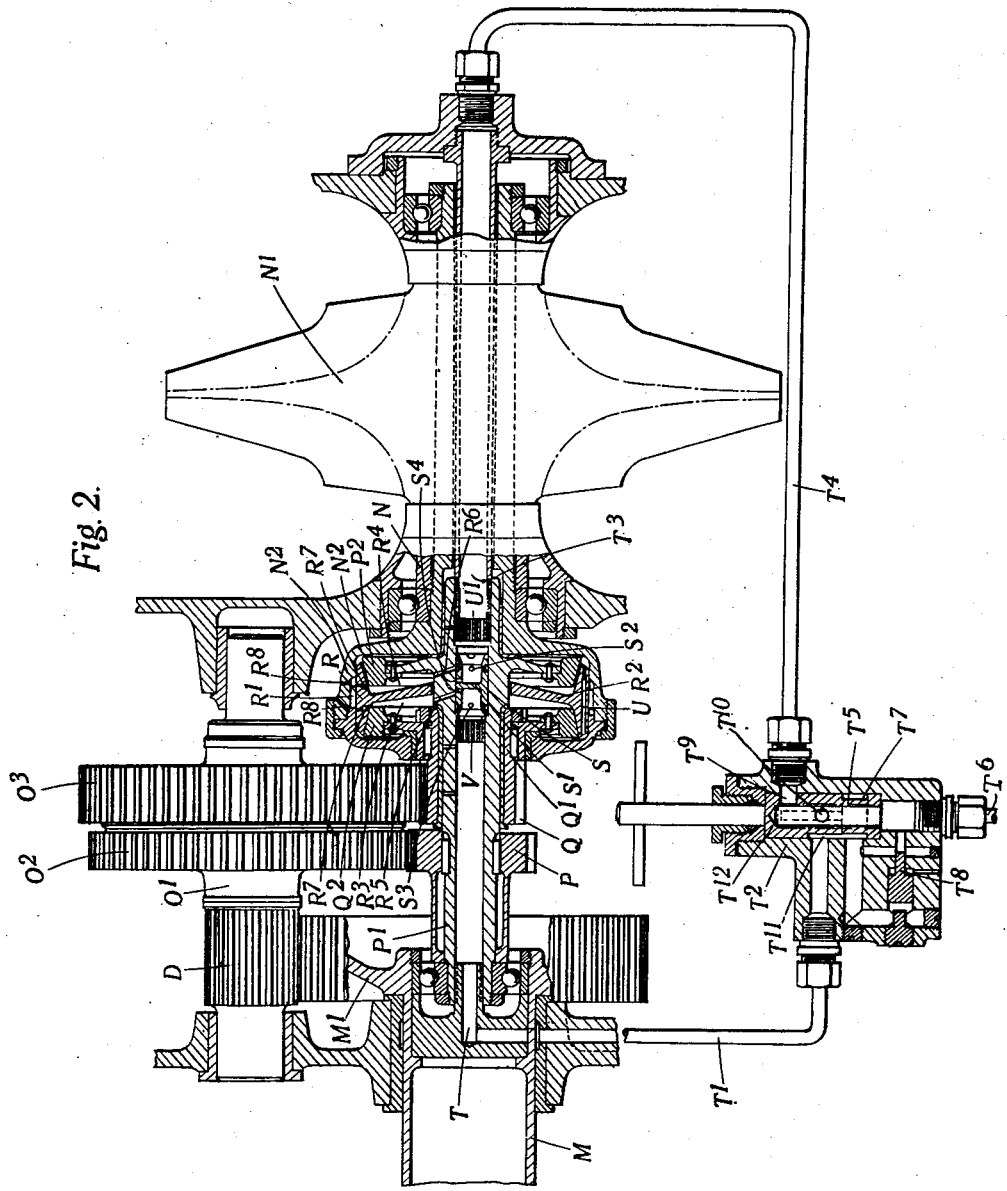

Patented Aug. 6, 1940

2,210,855

UNITED STATES PATENT OFFICE 2,210,855

FRICTION CLUTCH

Frank Bernard Halford, Edgware, England, assignor to D. Napier & Son Limited, London, England, a company of Great Britain Application October 3, 1938, Serial No. 233,122
In Great Britain October 6, 1937

8 Claims. (Cl. 74—364)

This invention relates to friction clutches of the kind in which engagement of friction members is brought about and maintained by relative axial movement produced between them by liquid pressure created at least in part by centrifugal force in a chamber rotating with the clutch members when engaged.

A clutch of the above kind according to the present invention comprises driving and driven members one of which is axially movable relatively to the other to effect engagement and disengagement of the clutch, two liquid chambers arranged so that liquid pressure created therein tends to cause axial movement of the axially movable clutch member respectively in opposite directions, and means whereby liquid can be admitted selectively to the chambers to cause axial movement of the axially movable clutch member into and out of engagement with the other clutch member.

The invention is particularly applicable to clutches for connecting a driving member to either of two driven members or a driven member to either of two driving members. Thus, in one form of clutch according to the invention the clutch comprises two driving or two driven clutch members, hereinafter referred to as "outer clutch members", lying one on either side of an intermediate clutch member which is axially movable relatively to the outer clutch members so as to bring one or other of two friction surfaces carried by the intermediate member into engagement with one or other of the outer clutch members according to the direction in which the intermediate member is moved, the intermediate clutch member constituting a dividing wall separating the adjacent ends of two liquid chambers, and means whereby liquid can be admitted selectively to the two liquid chambers to cause axial movement of the intermediate clutch member in one direction or the other relatively to the outer clutch members.

A construction having two outer clutch members and an intermediate clutch member as described above is particularly suitable for incorporation in variable ratio transmission mechanism, for example, for driving a supercharger for an internal combustion engine. Thus, variable ratio transmission mechanism incorporating such a clutch may comprise a driving shaft and two coaxial intermediate shafts connected to the driving shaft respectively by gearing of different ratios, each intermediate shaft being connected to one of the outer clutch members while the intermediate clutch member is connected to the driven shaft.

In any case, means are preferably provided for permitting continuous escape of liquid from each liquid chamber through a passage or passages of such total cross-sectional area that when liquid is supplied to either chamber substantially freely the chamber will be maintained substantially full of liquid but, by reducing or cutting off the supply of liquid thereto, the escape of liquid will take place at a sufficient rate to empty the chamber.

The invention may be carried into practice in various ways but two alternative constructions according to the invention are illustrated by way of example in the accompanying drawings, in which Figure 1 is a sectional side elevation, partly somewhat diagrammatic, of one construction, and Figure 2 is a similar view to Figure 1 of an alternative construction.

In the construction illustrated in Figure 1, the apparatus comprises a driving shaft A adapted to be driven, for example, through a gear wheel $A^1$ from an internal combustion engine and carrying two gear wheels $A^2$, $A^3$ of different diameters. The gear wheels $A^2$, $A^3$ mesh respectively with gear wheels B, C on two coaxial intermediate shafts $B^1$, $C^1$ one of which, $B^1$, passes freely through the other. The shaft $C^1$ is itself surrounded by a driven shaft D carrying the rotor $D^1$ of a supercharger, the shaft D being supported in bearings $D^2$ within a suitable casing indicated at $D^3$.

The shaft D carries at its end remote from the gear wheels B, C a cylindrical casing E and mounted to slide but not to rotate within this casing is a ring $E^1$ having one conical friction surface $E^2$ formed thereon and a member $E^3$ carrying an opposite conical friction surface $E^4$ rigidly secured thereto. Rigidly secured to the ring $E^1$ between the two friction surfaces is an annular partition wall $E^5$ which thus separates the interior of the casing E into two annular chambers and with the ring $E^1$ and member $E^3$ constitutes the intermediate clutch member.

The end of the shaft $C^1$ remote from the gear wheel C extends into the lefthand end of the casing E while the end of the shaft $B^1$ remote from the gear wheel B extends through the partition wall $E^5$ into the righthand end of the casing E, as shown. Formed or mounted on the righthand ends of the two shafts $B^1$, $C^1$ are discs $B^2$, $C^2$ constituting outer clutch members and provided with conical friction surfaces $B^3$, $C^3$ adapted to cooperate respectively with the friction surfaces $E^4$, $E^2$ through floating friction linings as shown. It will thus be seen that if the member $E^5$, $E^1$, $E^3$ is moved axially in one direction by liquid pressure on one side thereof, the friction surface $E^4$ will engage through the appropriate friction lining with the friction surface $B^3$ to cause power to be transmitted from the shaft B through the disc $B^2$, member $E^3$ and ring $E^1$ to the casing E and thence to the shaft D whereas movement of the partition wall $E^5$ in the other direction will cause dis-engagement of the friction surfaces $E^4$, $B^3$, and engagement of the friction surfaces $E^2$, $C^3$ through the other friction lining to cause the drive to be transmitted from the shaft C through the member $C^2$ and the ring $E^1$ to the casing E and hence to the shaft D.

Means are provided for delivering liquid selectively to the liquid chambers F, $F^1$ lying on the two sides of the partition wall $E^5$. Thus, a tube G passes through the shaft $B^1$ with clearance so as to leave between the tube G and the shaft $B^1$ an annular passage $G^1$, this annular passage opening at its right-hand end into a chamber $G^2$ communicating through ports $G^3$ with the chamber $F^1$ while the interior of the tube G communicates through a chamber $G^4$ and ports $G^5$ with the chamber F. The lefthand end of the tube G communicates through a passage H with a pipe $H^1$ while the lefthand end of the annular passage $G^1$ communicates through a chamber J with a pipe $J^1$, the two pipes $H^1$ and $J^1$ communicating with diametrically opposite sides of a cylindrical valve casing K containing a tubular rotary distributing valve $K^1$ the interior of which communicates with a high pressure oil supply pipe $K^2$. The valve $K^1$ is provided with a port $K^3$ which by rotation of the valve, for example by a shaft and handle indicated at $K^4$, can be brought into communication with the pipe $H^1$ or $J^1$ as desired.

It will thus be seen that oil can be supplied through the pipe $H^1$ to the interior of the tube G and thence to the liquid chamber F or through the pipe $J^1$ and thence through the annular passage $G^1$ to the chamber $F^1$. Relief passages $F^2$, $F^3$, $F^4$ of small cross-sectional area are provided in the circumferential wall of the chamber $F^1$ to permit escape of liquid therefrom while similar relief passages $F^5$, $F^6$, $F^7$, $F^8$ are provided for the escape of liquid from the chamber F, these passages, however, being of such small cross-sectional area that while when the supply of liquid to either chamber is cut off they will permit the chamber to empty, when liquid is supplied to either chamber the rate of supply will be such as substantially to fill the chamber with liquid.

It will thus be seen that by supplying liquid to one or other of the chambers F and $F^1$, the shaft D can be driven from one or other of the shafts $B^1$, $C^1$, the ratio of transmission from the shaft A being different in each case due to the different ratios of the gearing $A^2$, B and $A^3$, C respectively.

As shown, the shaft $C^1$ is conveniently supported in bearings $C^4$ within the shaft D while the shaft $B^1$ is supported in bearings $B^4$ within the shaft $C^1$. Passages $B^5$ are provided for the supply of lubricating oil from the interior of the tube G to the bearings $B^4$ while passages $B^6$ are provided for the supply of lubricating oil from the annular passage $G^1$ or chamber $G^2$ to the bearings $B^4$.

Similarly, passages $C^5$ are provided to supply lubricating oil from the interior of the tube G to the lefthand bearing $C^4$ and from the passage $B^5$ to the righthand bearing $C^4$ while passages $C^6$ are provided for the supply of lubricating oil from the annular space $G^1$ to the bearings $C^4$.

Thus, lubricating oil is supplied to these bearings either from the interior of the tube G or from the annular passage $G^1$, whichever of these two passages is for the moment being supplied with oil from the valve K, $K^1$.

Drain holes $F^9$ are arranged in the casing E to the left and right of the ring $E^1$ and these drain holes should be of such cross-sectional area that when oil is delivered to one side of the partition member $E^5$ they initially prevent the too rapid escape from the casing of oil which may then flow between the separated friction surfaces $E^2$, $C^3$ or $E^4$, $B^3$. This oil thus collects and causes a building up of oil pressure in the space L or $L^1$, as the case may be, which causes initial movement of the ring $E^1$ in one direction or the other to bring the appropriate friction surfaces into engagement. Further escape of oil between these friction surfaces is then prevented so that the path for the escape of oil is then limited to the passages $F^2$, $F^3$, $F^4$, or $F^5$, $F^6$, $F^7$, $F^8$, and the oil in the chamber L or $L^1$ escapes through the drain holes $F^9$.

It will be seen that in the construction shown the friction surfaces $E^2$, $C^3$ are of larger diameter than the friction surfaces $E^4$, $E^3$ and that their conical angle is different. Thus the larger diameter friction surfaces and the larger oil chamber $F^1$ are associated with the higher gear ratio and these larger friction surfaces are thus adapted to transmit the larger degree of torque required when this higher ratio is in operation.

In each case the engaging friction surfaces may be formed respectively for example of bronze and hardened steel or one of such surfaces may be of a resilient moulded material such as is used for vehicle clutches and brakes.

In the alternative construction illustrated in Figure 2, the apparatus comprises a driving shaft M connected to the internal combustion engine and a driven shaft N coaxial therewith carrying the rotor $N^1$ of the supercharger. The driving shaft M carries a gear wheel $M^1$ which meshes with a driving gear wheel O on a lay-shaft $O^1$. The lay-shaft $O^1$ carries two driven gear wheels $O^2$, $O^3$ of different diameter meshing respectively with gear wheels P and Q arranged coaxially with the driving shaft and mounted respectively on two intermediate shafts $P^1$ and $Q^1$. It will thus be seen that these two intermediate shafts $P^1$ and $Q^1$ are driven at different speeds.

Mounted on the end of the driven shaft N adjacent to the intermediate shafts $P^1$ and $Q^1$ is an annular casing $N^2$ into which the two intermediate shafts $P^1$ and $Q^1$ project. The ends of the intermediate shafts $P^1$, $Q^1$ which project into the casing $N^2$ carry conical friction members $P^2$, $Q^2$ each constituting the driving member of a friction clutch.

Interposed between the two driving friction members $P^2$, $Q^2$ is a common intermediate driven member R capable of moving axially but not of rotating relatively to the annular casing to which it is thus connected for example by splines $R^1$. This conical friction member R has conical friction surfaces adapted to cooperate with the conical friction surfaces of the driving members $P^2$, $Q^2$, as shown, so that it can be frictionally connected to one or other of these driving members by axial movement in one direction or the other.

The common driven clutch member R is formed with a partition wall $R^2$ so that it divides the interior of the annular casing $N^2$ into two liquid chambers $R^3$, $R^4$. Inlet ports $R^5$, $R^6$ for the admission of liquid to the chambers $R^3$, $R^4$ are formed in the shaft $P^1$, these ports being controlled by a shuttle-type piston valve S disposed and longitudinally movable within limits within the shaft $P^1$. The valve S is of tubular form and is provided with a partition $S^1$ separating its two ends. The valve is formed with radial main ports $S^2$, $S^3$ so formed that when the shuttle valve is moved into its lefthand position, the ports $S^2$ communicate with the ports $R^6$ as shown while when the shuttle valve is moved into its righthand position the ports $S^3$ communicate with the ports $R^5$. The shuttle valve is also provided with subsidiary ports $S^4$ of smaller cross-sectional area one of which communicates with the port $R^5$ when the ports $S^2$ communicate with the ports $R^6$ while the other communicates with the ports $R^6$ when the ports $S^3$ communicate with the ports $R^5$.

The lefthand end of the shaft $P^1$ communicates through a passage T with a pipe $T^1$ leading to a valve casing $T^2$ while the righthand end of the shaft $P^1$ communicates through a passage $T^3$ with a pipe $T^4$ also leading to the valve casing $T^2$. Disposed within a tubular bore in the valve casing $T^2$ is a tubular valve $T^5$ the interior of which communicates at all times directly with a high pressure oil supply pipe $T^6$ while an annular recess $T^7$ therein communicates with the pipe $T^6$ through a pressure-reducing valve $T^8$. The valve $T^8$ is only diagrammatically illustrated since in itself it forms no part of the invention, being of the known type wherein the valve is in the form of a differential piston, the larger face of which is subject to the lower pressure while the smaller face is subject to the higher pressure. The valve is provided with two ports $T^9$, $T^{10}$ and with two external longitudinal grooves $T^{11}$, $T^{12}$ so formed that when the port $T^9$ is brought into communication with the pipe $T^4$ so that high pressure oil is supplied thereto, the groove $T^{11}$ comes into communication with the pipe $T^1$ so that low pressure oil is supplied to this pipe whereas when the valve is turned so that the port $T^{10}$ communicates with the pipe $T^1$ so that high pressure oil is delivered to this pipe, then the groove $T^{12}$ communicates with the pipe $T^4$ so that low pressure oil is delivered to this pipe.

When high pressure oil is delivered to the pipe $T^4$ and low pressure oil to the pipe $T^1$, as shown, the shuttle valve S is moved to the left so that the high pressure oil is delivered through the ports $S^2$ and $R^6$ to the chamber $R^4$, thereby moving the member R to the left into engagement with the conical clutch member $Q^2$. At the same time, a small amount of low pressure oil is delivered through the appropriate port $S^4$ and the port $R^5$ to the chamber $R^3$ for lubricating and cooling purposes. Small outlet passages $R^7$, $R^8$ are formed in the member R and in the casing $N^2$ so that in conjunction with leakage between the part R and the casing $N^2$ oil flows continuously from the chambers $R^3$ and $R^4$.

With the apparatus in the position shown, the supply of oil to the chamber $R^4$ is at such a rate that this chamber will be maintained substantially full of oil, whereas the supply of oil to the chamber $R^3$ is only sufficient for lubricating and cooling purposes and this chamber thus at any moment contains only a very small quantity of oil. It will be seen that by turning the valve $T^5$ into its other position so that high pressure oil is delivered to the pipe $T^1$ and low pressure oil to the pipe $T^4$, the shuttle valve S will be moved to the right so that high pressure oil in comparatively large quantities will be supplied to the chamber $R^3$ and low pressure oil in comparatively small quantities will be supplied to the chamber $R^4$ so that the member R will be moved to the right so that it engages with the conical friction member $P^2$. In this way the drive can be transmitted at will either through the member $Q^2$ by the shaft $Q^1$ and gearing Q, $O^3$ at the higher gear ratio or through the member $P^2$, shaft $P^1$ and gearing P, $O^2$ at the lower gear ratio.

In order to compensate for variations in the viscosity of the oil, for example to allow for the higher viscosity when the oil is cold so that under these conditions excess of oil will not collect in that one of the two chambers $R^3$, $R^4$ which at any moment is supplied with low pressure oil, viscous resistance elements V, $V^1$ may be provided, as shown, in the interior of the shaft $P^1$, these resistance elements having such characteristics that they will reduce the flow of low pressure oil when the viscosity is high to prevent the supply of more low pressure oil than can escape through the passages $R^7$, $R^8$.

Holes U are preferably provided in the member R to ensure balancing of any oil pressures on the outside of the members $Q^2$, $P^2$.

Further the control of the oil to vary the ratio of transmission in the apparatus illustrated may be effected manually or automatically.

It will be seen that with the transmission apparatus shown, the clutch operates at high speed and with small torque so that it can be light and small.

What I claim as my invention and desire to secure by Letters Patent is:

1. Variable ratio transmission mechanism more particularly for driving a supercharger of an internal combustion engine including in combination a driving shaft, two coaxial intermediate shafts, multiplying gearing of different ratios respectively connecting the two intermediate shafts to the driving shaft, a driven shaft coaxial with the intermediate shaft and a plurality of clutches comprising two outer members constituting driving members connected respectively to the intermediate shafts, an intermediate member constituting a driven member connected to the driven shaft and axially movable relatively to the outer members, two liquid chambers the adjacent ends of which are separated by the intermediate member, the outer end walls of the chambers being formed respectively by the outer clutch members, two friction surfaces on the intermediate member adapted to cooperate respectively with friction surfaces on the outer clutch members, means whereby liquid can be supplied selectively to the two liquid chambers to cause the said intermediate member to move axially in one direction or the other under the action of liquid pressure created at least partly by centrifugal force in the appropriate chamber to bring the friction surfaces thereon selectively into engagement with the friction surfaces on the outer clutch members.

2. Variable ratio transmission mechanism more particularly for driving a supercharger of an internal combustion engine including in combination a driving shaft, two coaxial intermediate shafts, multiplying gearing of different ratios respectively connecting the two intermediate shafts to the driving shaft, a driven shaft coaxial with the intermediate shaft and a plurality of clutches comprising two outer members constituting driving members connected respectively to the intermediate shafts, an intermediate member constituting a driven member connected to the driven shaft and axially movable relatively to the outer members, two liquid chambers the adjacent ends of which are separated by the intermediate member the outer end walls of the chambers being formed respectively by the outer clutch members, two friction surfaces on the intermediate member adapted to cooperate respectively with friction surfaces on the sides of the outer clutch members remote from the intermediate member, means whereby liquid can be supplied selectively to the two liquid chambers to cause the said intermediate member to move axially in one direction or the other under the action of liquid pressure created at least partly by centrifugal force in the appropriate chamber to bring the friction surfaces thereon selectively into engagement with the friction surfaces on the outer clutch members.

3. Variable ratio transmission mechanism more particularly for driving a supercharger of an internal combustion engine including in combination a driving shaft, two coaxial intermediate shafts, multiplying gearing of different ratios respectively connecting the two intermediate shafts to the driving shaft, a driven shaft coaxial with the intermediate shaft and a plurality of clutches comprising two outer members constituting driving members connected respectively to the intermediate shafts, an intermediate member constituting a driven member connected to the driven shaft and axially movable relatively to the outer members, two liquid chambers the adjacent ends of which are separated by the intermediate member the outer end walls of the chambers being formed respectively by the outer clutch members, two friction surfaces on the intermediate member constituted respectively by two frusto-conical surfaces with their parts of larger diameter lying adjacent to one another adapted to cooperate respectively with friction surfaces on the sides of the outer clutch members remote from the intermediate member, means whereby liquid can be supplied selectively to the two liquid chambers to cause the said intermediate member to move axially in one direction or the other under the action of liquid pressure created at least partly by centrifugal force in the appropriate chamber to bring the friction surfaces thereon selectively into engagement with the friction surfaces on the outer clutch members.

4. Variable ratio transmission mechanism more particularly for driving a supercharger of an internal combustion engine including in combination a driving shaft, two coaxial intermediate shafts, multiplying gearing of different ratios respectively connecting the two intermediate shafts to the driving shaft, a driven shaft coaxial with the intermediate shaft and a plurality of clutches comprising two outer members constituting driving members connected respectively to the intermediate shafts, an intermediate member constituting a driven member connected to the driven shaft and axially movable relatively to the outer members, two liquid chambers the adjacent ends of which are separated by the intermediate member the outer end walls of the chambers being formed respectively by the outer clutch members, two friction surfaces on the intermediate member constituted respectively by two frusto-conical surfaces with their parts of larger diameter lying adjacent to one another adapted to cooperate respectively with friction surfaces on the sides of the outer clutch members remote from the intermediate member and arranged so that the cooperating conical friction surfaces through which the drive is transmitted at the higher ratio are larger than those through which the drive is transmitted at the lower ratio, means whereby liquid can be supplied selectively to the two liquid chambers to cause the said intermediate member to move axially in one direction or the other under the action of liquid pressure created at least partly by centrifugal force in the appropriate chamber to bring the friction surfaces thereon selectively into engagement with the friction surfaces on the outer clutch members.

5. Variable ratio transmission mechanism more particularly for driving a supercharger of an internal combustion engine including in combination a driving shaft, two coaxial intermediate shafts, multiplying gearing of different ratios respectively connecting the two intermediate shafts to the driving shaft, a driven shaft coaxial with the intermediate shaft and a plurality of clutches comprising two outer members constituting driving members connected respectively to the intermediate shafts, an intermediate member constituting a driven member connected to the driven shaft and axially movable relatively to the outer members, two liquid chambers the adjacent ends of which are separated by the intermediate member the outer end walls of the chambers being formed respectively by the outer clutch members, two friction surfaces on the intermediate member adapted to cooperate respectively with friction surfaces on the outer clutch members, means whereby liquid can be supplied selectively to the two liquid chambers to cause the said intermediate member to move axially in one direction or the other under the action of liquid pressure created at least partly by centrifugal force in the appropriate chamber to bring the friction surfaces thereon selectively into engagement with the friction surfaces on the outer clutch members, and means for permitting the continuous escape of liquid from each liquid chamber at a rate less than that at which liquid can be selectively supplied to either chamber.

6. Variable ratio transmission mechanism more particularly for driving a supercharger of an internal combustion engine including in combination a driving shaft, two coaxial intermediate shafts, multiplying gearing of different ratios respectively connecting the two intermediate shafts to the driving shaft, a driven shaft coaxial with the intermediate shaft and a plurality of clutches comprising two outer members constituting driving members connected respectively to the intermediate shafts, an intermediate member constituting a driven member connected to the driven shaft and axially movable relatively to the outer members, two liquid chambers the adjacent ends of which are separated by the intermediate member the outer end walls of the chambers being formed respectively by the outer clutch members, two friction surfaces on the intermediate member adapted to cooperate respectively with friction surfaces on the outer clutch members, means whereby liquid can be supplied selectively to the two liquid chambers to cause the said intermediate member to move axially in one direction or the other under the action of liquid pressure created at least partly by centrifugal force in the appropriate chamber to bring the friction surfaces thereon selectively into engagement with the friction surfaces on the outer clutch members and means whereby when liquid is supplied to one liquid chamber to cause axial movement of the intermediate member, a comparatively small quantity of liquid is supplied also for lubricating or cooling purposes to the other or inoperative liquid chamber at a rate such that it can escape at the same rate through an outlet passage or passages so that the said inoperative chamber does not become filled with liquid.

7. Variable ratio transmission mechanism more particularly for driving a supercharger of an internal comhustion engine including in combination a driving shaft, two coaxial intermediate shafts, multiplying gearing of different ratios respectively connecting the two intermediate shafts to the driving shaft, a driven shaft coaxial with the intermediate shaft and a plurality of clutches comprising two outer members constituting driving members connected respectively to the intermediate shafts, an intermediate member constituting a driven member connected to the driven shaft and axially movable relatively to the outer members, two liquid chambers the adjacent ends of which are separated by the intermediate member the outer end walls of the chambers being formed respectively by the outer clutch members, two friction surfaces on the intermediate member adapted to cooperate respectively with friction surfaces on the outer clutch members, a piston type valve controlling two passages whereby liquid can be selectively supplied to the liquid chambers and constructed and arranged so that the pressures in the two passages act thereon in opposite directions whereby the valve is moved to open the passage in which the higher pressure at any moment exists and close the other passage.

8. Variable ratio transmission mechanism more particularly for driving a supercharger of an internal combustion engine including in combination a driving shaft, two coaxial intermediate shafts, multiplying gearing of different ratios respectively connecting the two intermediate shafts to the driving shaft, a driven shaft coaxial with the intermediate shaft and a plurality of clutches comprising two other members constituting driving members connected respectively to the intermediate shafts, an intermediate member constituting a driven member connected to the driven shaft and axially movable relatively to the outer members, two liquid chambers the adjacent ends of which are separated by the intermediate member the outer end walls of the chambers being formed respectively by the outer clutch members, two friction surfaces on the intermediate member adapted to cooperate respectively with friction surfaces on the outer clutch members, the liquid chambers communicating with the supply passages, means whereby when liquid is supplied at higher pressure to one supply passage it is simultaneously supplied at lower pressure to the other supply passage and means for reducing automatically the rate of flow of liquid to the inoperative liquid chamber when the viscosity of the liquid is high as compared with that when the viscosity is low.

FRANK BERNARD HALFORD.